(12) United States Patent
Kelfoun

(10) Patent No.: US 7,359,845 B2
(45) Date of Patent: Apr. 15, 2008

(54) METHOD AND SYSTEM FOR PREDICTIVE STRATIGRAPHY IMAGES

(75) Inventor: Florent Kelfoun, Aberdeen (GB)

(73) Assignee: Baker Hughes Incorporated, Houston, TX (US)

( * ) Notice: Subject to any disclaimer, the term of this patent is extended or adjusted under 35 U.S.C. 154(b) by 213 days.

(21) Appl. No.: 11/273,501

(22) Filed: Nov. 14, 2005

(65) Prior Publication Data
US 2006/0161406 A1    Jul. 20, 2006

Related U.S. Application Data

(60) Provisional application No. 60/627,569, filed on Nov. 12, 2004.

(51) Int. Cl.
G06F 9/455 (2006.01)

(52) U.S. Cl. .............................. 703/10; 703/2; 703/11; 324/303; 702/6; 702/7

(58) Field of Classification Search ................ 703/10, 703/2, 11; 324/303; 73/152.14; 702/6, 702/7; 706/8; 166/248, 374; 367/25, 76
See application file for complete search history.

(56) References Cited

U.S. PATENT DOCUMENTS

| | | | | |
|---|---|---|---|---|
| 5,311,951 | A | | 5/1994 | Kyte et al. ................. 175/40 |
| 6,023,443 | A | * | 2/2000 | Dubinsky et al. ............. 367/76 |
| 6,084,826 | A | | 7/2000 | Leggett, III ................ 367/82 |
| 6,088,294 | A | * | 7/2000 | Leggett et al. .............. 367/25 |
| 2003/0141053 | A1 | * | 7/2003 | Yuan et al. ................ 166/248 |
| 2003/0182093 | A1 | * | 9/2003 | Jones et al. ................ 703/11 |
| 2003/0205082 | A1 | * | 11/2003 | Herron et al. ............ 73/152.14 |
| 2003/0231017 | A1 | * | 12/2003 | Kiesl et al. ................ 324/303 |
| 2004/0122634 | A1 | * | 6/2004 | Calvert et al. ............... 703/2 |
| 2004/0133351 | A1 | * | 7/2004 | Frenkel et al. ............... 702/7 |
| 2004/0133531 | A1 | * | 7/2004 | Chen et al. .................. 706/8 |
| 2004/0154831 | A1 | | 8/2004 | Seydoux et al. ............. 174/24 |
| 2004/0158997 | A1 | | 8/2004 | Tang .......................... 33/304 |
| 2004/0182580 | A1 | * | 9/2004 | Moore et al. ............... 166/374 |
| 2005/0256643 | A1 | * | 11/2005 | Boitnott ...................... 702/6 |

FOREIGN PATENT DOCUMENTS

| | | |
|---|---|---|
| CA | 2383379 | 10/2003 |
| WO | WO98/17894 | 4/1998 |

* cited by examiner

Primary Examiner—Paul Rodriguez
Assistant Examiner—Kandasamy Thangavelu
(74) Attorney, Agent, or Firm—Madan, Mossman & Sriram, P.C.

(57) ABSTRACT

Methods and systems are provided for displaying and forecasting the lithology and wellbore conditions to be encountered while conducting drill string operations in a wellbore. A method and system is described for predicting and modeling lithology while operating a drill string in a wellbore, comprising: developing a 3-D lithological model of a subsurface area; projecting a well path through said subsurface area; determining an open cylinder lithology display of said projected well path; and recording said determined open cylinder display. The open cylinder lithology display (the Predictive Stratigraphy Image) may be displayed with geological or structural cross-sections to compare the well path and the predicted well path, with the actual subsurface environment. Data acquired during drilling operations can be used in real time to update the model or the Predictive Stratigraphy Image, and the results compared with Predictive Image Logs and other wellbore images and data.

13 Claims, 9 Drawing Sheets

METHOD AND SYSTEM FOR PREDICTIVE STRATIGRAPHY IMAGES

CROSS REFERENCES TO RELATED APPLICATIONS

This application claims priority from U.S. Provisional Patent Application No. 60/627,569 filed on Nov. 12, 2004.

BACKGROUND OF THE INVENTION

1. Field of the Invention

This invention relates to the field of subsurface reservoir development, to a method of geosteering and for a system predicting the subsurface environment ahead of a drill bit. The methods and systems are related generally to drilling and measurement systems and more particularly to a system of drilling boreholes having a measurement-while-drilling or logging-while-drilling (MWD or LWD) tool wherein the tool measurements are used to predict and guide the drilling operation.

2. Description of the Related Art

In the oil and gas industry, those skilled in the art have long recognized the importance of obtaining various borehole measurements during the course of a drilling operation. Typically, these measurements include such data as the weight imposed on the drill bit, the torque applied to the drill string, the inclination and azimuthal direction of the borehole interval that is then being drilled, borehole pressures and temperatures, drilling mud conditions as well as formation parameters including, but not limited to, resistivity and natural gamma emission of the earth formations being penetrated. Heretofore most of these measurements were obtained either by temporarily positioning special measuring devices in the drill string or by periodically removing the drill string and employing suitable wireline logging tools.

In recent years, however, the drilling technology has advanced sufficiently that these measurements can now be readily obtained by so-called measurement-while-drilling or "MWD" tools that are tandemly coupled in the drill string and operated during the drilling operation. Several MWD tools presently in commercial operation typically include a thick-walled tubular body carrying various sensors and their associated measurement-encoding circuitry often positioned in the drill string just above the drill bit for measuring the conditions near the bottom of the borehole. These commercial tools generally employ a selectively-operable acoustic signaler which is cooperatively arranged in the tool body for successively transmitting encoded measurement signals through the drilling mud and/or within the drill string to the surface where the signals are detected and recorded by suitable surface instrumentation.

The typical commercial MWD tool is arranged as a multi-sectional tool having various special-purpose modules that are respectively housed in separable thick-walled bodies and suitably arranged to be coupled together in various combinations for assembling an MWD tool capable of obtaining one or more selected measurements. The multiple sections require both mechanical and electrical connections, such as the prior art arrangement shown in FIG. 1. The illustrated components, known in the prior art, include transmitters and sensors for determining downhole formation characteristics. The prior art methods and apparatus include downhole tools comprising acoustic signal transmitters and sensors to determine, for example, subsurface formation velocity as the tool traverses the formation. This type of measurement does not provide for determining an image of subsurface formation reflectors before the drill bit has reached the reflectors. Downhole tools comprise one more sensor subs for data acquisition and are not limited to gamma ray and resistivity methods.

U.S. Pat. No. 6,088,294 to Legget et al, discloses an invention that provides a closed-loop system for drilling boreholes. The system includes a drill string having a drill bit and a downhole subassembly having a plurality of sensors and MWD devices, a downhole computing system and a two-way telemetry system for computing downhole bed boundary information relative to the downhole subassembly. The downhole subassembly includes an acoustic MWD system which contains a first set of acoustic sensors for determining the formation acoustic velocities during drilling of the wellbore and a second set of acoustic sensors that utilizes the acoustic velocities measured by the system for determining bed boundaries around the downhole subassembly. A computing system is provided within the downhole subassembly which processes downhole sensor information and computes the various parameters of interest including the bed boundaries, during drilling of the wellbore. In one embodiment, the first and second sets (arrangements) of acoustic sensors contain a transmitter and a receiver array, wherein the transmitter and some of the receivers in the receiver array are common to both sets of acoustic sensors. Each receiver in the receiver array further may contain one or more individual acoustic sensors. In one configuration, the distance between the transmitter and the farthest receiver in one of the acoustic sensor sets is substantially greater than the distance between the transmitter and center of the receivers in the second set. The downhole computing system contains programmed instructions, models, algorithms and other information, including information from prior drilled boreholes, geological information about the subsurface formations and the borehole drill path. This invention is directed to determining formation boundaries adjacent (normal) to the logging tool.

In drilling a borehole to recover oil from the earth, it is often helpful to turn or steer the downhole drill bit toward, away, from or through subterranean targets. To facilitate steering drillers need to know the subsurface drill bit location. The location of targets ahead of the bit may also be required, as well as some warning or indication of drilling hazards such as over-pressured formations or thin, shallow gas intervals. Surface seismic surveys generally include this type of information, but resolution and depth location of these data may be poor because surface seismic surveys are time based (rather than depth based) and the low frequencies generally available are not conducive for high resolution. For example, to determine the depth of a reflection, a speed of sound for the earth formation must be known. Consequently, these systems require depth calibration to accurately determine locations of target horizons or drilling hazards. Traditionally, this calibration has been provided by either offset well sonic data or wireline checkshot data in the current well. Offset data is often inadequate however due to horizontal variations in stratigraphy between wells.

There is a need to be able to plan complex well paths through subsurface reservoirs for optimal placement to the most productive locations. There is a need for a method and system of receiving data from the vicinity of the drilling string generally and the drill bit particularly without the need to halt drilling operations, and to model and predict accurately the subsurface reservoir conditions. Additionally, there is a need to vary such models and predictions as actual data from the subsurface drill path becomes available.

The methods of the present invention overcome the foregoing disadvantages of the prior art by providing systems and methods for modeling and predicting subsurface conditions and adapting the model with subsurface data as the data are acquired as the drill string operations are conducted within the wellbore.

SUMMARY OF THE INVENTION

The present invention provides a method and system for displaying and forecasting the lithology and wellbore conditions to be encountered while drill string operations are conducted in a wellbore. A method and system is described for predicting and modeling lithology while operating a drill string in a wellbore, comprising: developing a 3-D lithological model of a subsurface area; projecting a well path through said subsurface area; determining an open cylinder lithology display of said projected well path; and recording said determined open cylinder display. The open cylinder lithology display (the Predictive Stratigraphy Image) may be displayed with geological or structural cross-sections to compare the well path, with the predicted and actual subsurface environment. As drilling operations are undertaken, data acquired during drilling from the subsurface can be used to update the model or the Predictive Stratigraphy Image, and the results compared with Predictive Image Logs and other wellbore images and data.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

The present invention is a method and system for a displaying lithology along a well bore path and is useful for direct comparison with geological and or structural cross-section displays. The lithology display provided by the present invention (herein termed the Predictive Stratigraphy Image or PSI) may be displayed along with geological cross-sections and conventional well bore images as well as with property cross-section displays of the subsurface environment. The present invention overcomes the deficiencies of prior methods, for example the difficulty in choosing bed boundary positions directly from image logs and conventional logging measurements. Other advantages of the invention will be readily apparent to persons skilled in the art based on the following detailed description. While the invention is herein described in connection with various embodiments, it will be understood that the invention is not limited thereto. To the extent that the following detailed description is specific to a particular embodiment or a particular use of the invention, this is intended to be illustrative and is not to be construed as limiting the scope of the invention.

Figure 2:
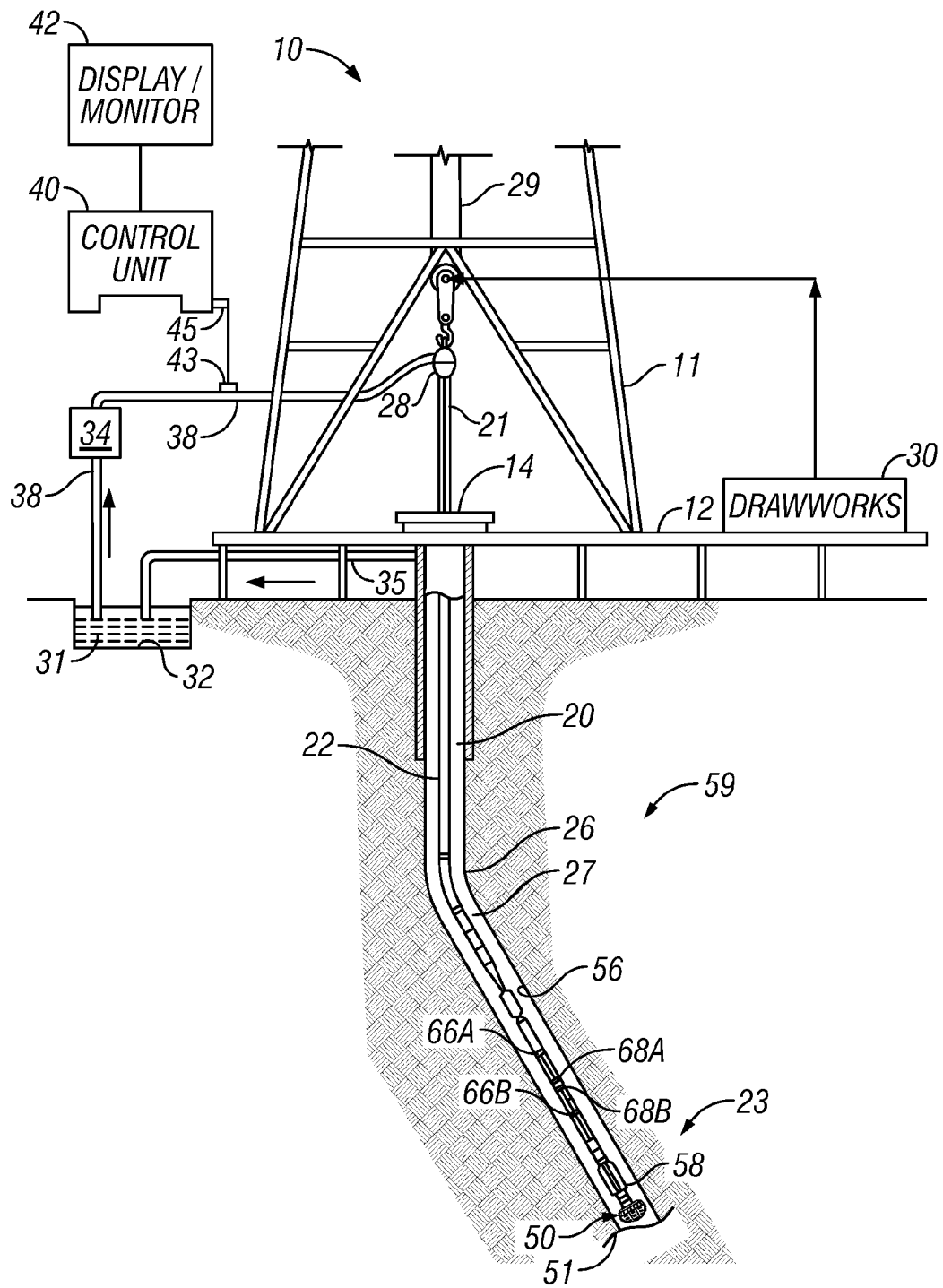
FIG. 2 is a schematic of a drilling system according to one embodiment of the present invention.

FIG. 2 shows a schematic diagram of a drilling system 10 having a downhole assembly containing a downhole sensor system and the surface devices according to one embodiment of the present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formation 23 when it is rotated. The drill string 20 is coupled to a drawworks 30 via a kelly joint 21, swivel 28 and line 29 through a system of pulleys (not shown). During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger (not shown), fluid line 38 and the kelly joint 21. The drilling fluid is discharged at the borehole bottom S1 through an opening in the drill bit 50. The drilling fluid circulates uphole through the annular space 27 between the drill string 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 or other appropriate places and processes such signals according to programmed instructions provided to the surface control unit. The surface control unit 40 displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The surface control unit 40 optionally includes and/or mirrors all the functionality of the downhole data acquisition tool 58 as illustrated non-comprehensively in FIG. 3 including sensors, memory, at least one processor, a clock and a communication port. The control unit 40 is preferably adapted to activate alarms 44 when certain unsafe or undesirable operating conditions occur.

In one embodiment of the present invention, the downhole drilling assembly 59 (also referred to as the bottomhole assembly or "BHA") which contains the various sensors and MWD devices to provide information about the formation 23 and downhole drilling parameters, is coupled between the drill bit 50 and the drill pipe 22.

Figure 1:
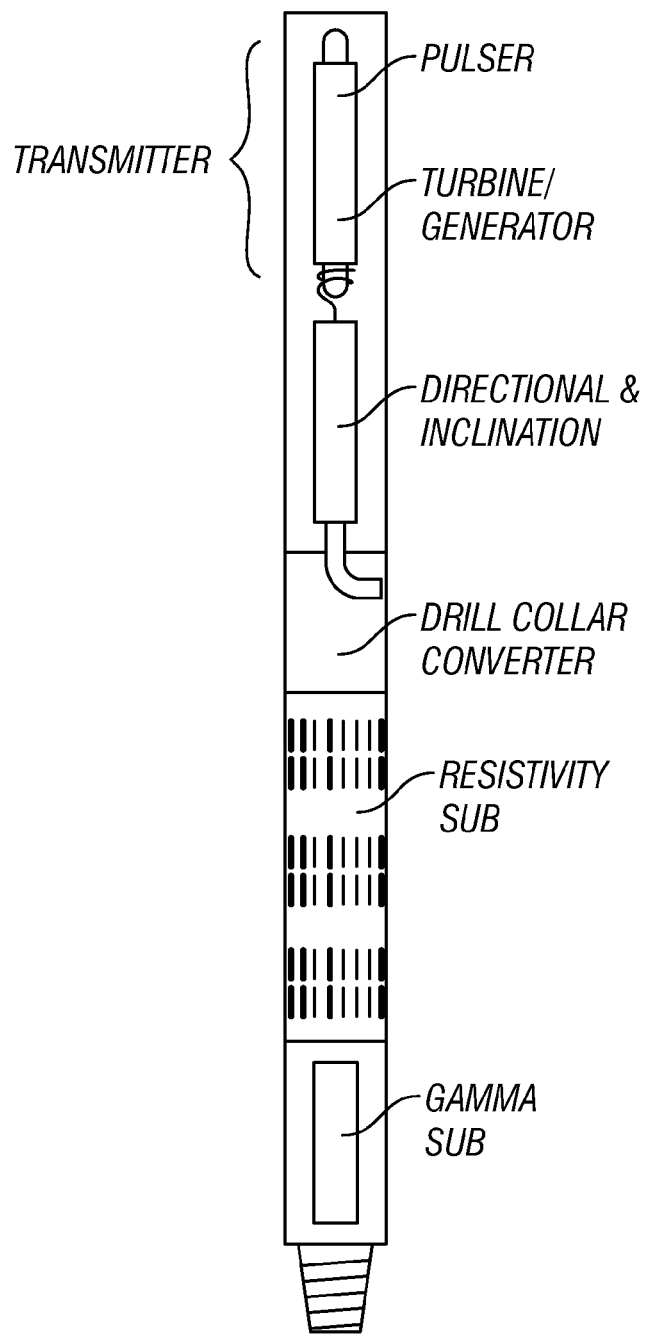
FIG. 1 is a schematic of a prior art MWD downhole tool.

Referring to FIG. 2, the BHA 59 also contains downhole sensors and devices in addition to the above-described surface sensors to measure downhole parameters of interest. Such devices include, but are not limited to, a device for measuring the formation resistivity near the drill bit, a gamma ray device for measuring the formation gamma ray intensity, devices for determining the inclination and azimuth of the drill string, and pressure sensors for measuring drilling fluid pressure downhole. The above-noted devices transmit data to the downhole PULSER (e.g., FIG. 1), which in turn transmits the data uphole to the surface control unit 40. The present invention may utilize a mud pulse telemetry technique or other communication technique to communicate data from downhole sensors and devices during drilling operations. A transducer placed in the mud supply line 38 detects the mud pulses responsive to the data transmitted by the downhole PULSER. Transducer 43 generates electrical signals in response to the mud pressure variations and transmits such signals via a conductor 45 to the surface control unit 40. Alternatively, other telemetry techniques such electromagnetic and acoustic techniques or any other suitable technique may be utilized for the purposes of this invention.

Figure 3:
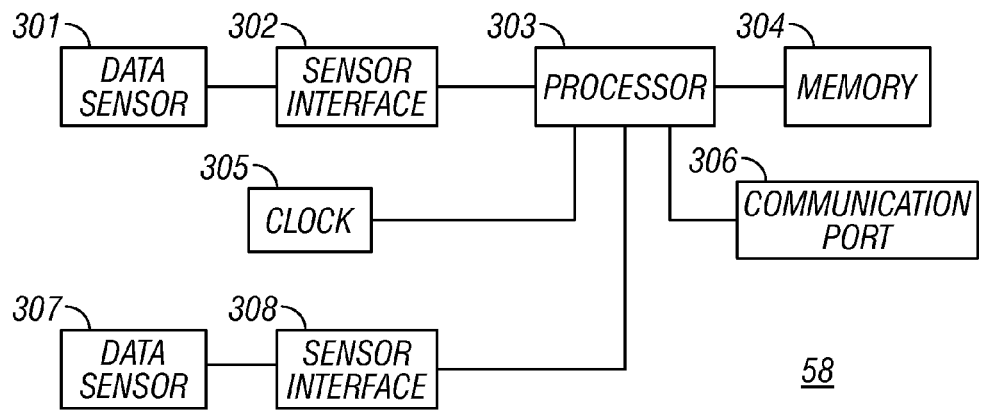
FIG. 3 is a schematic of a downhole data acquisition system for use in one embodiment of the present invention.

Referring to FIG. 3, the (downhole) data acquisition tool 58 may additionally comprise a combination of sensors 301 such as for resistivity, density, acoustic or radiation measurements as known in the art, along with suitable sensor interface circuitry 302, a processor 303, and memory 304 for storage of programmed instructions and storage of received downhole data. A real time clock circuit 305 is also included in the data acquisition tool 58 to provide time stamps for the received seismic or other data signals. The surface located real-time clock and the seismic receiver located real-time clock 305 are synchronized at the surface before deploying the sensors of 58 into the wellbore 26 or into the drill string 20. A communications port 306 can be included to download program instructions to memory 304 and to upload stored data to a surface system such as a surface processor or control unit 40. The receiver 58 is powered by batteries (not shown) or other energy source (e.g., fuel cells, downhole generator, wireline, etc.). A similar receiver that is deployable by slick-line is described in U.S. Pat. No. 5,555,220 to Minto, assigned to the assignee of this application and incorporated herein by reference. While data acquisition system 58 is illustrated in FIG. 2 at the terminal position within a drill string, the location and number of tool deployments are flexible. The (downhole) data acquisition tool 58 may further comprise additional combinations of sensors 307 such as for resistivity, density, acoustic or radiation measurements as known in the art, along with suitable sensor interface circuitry 308, which also tie into a processor 303, and memory 304 for storage of programmed instructions and storage of received downhole data.

Navigation through a reservoir requires precise understanding of the reservoir geometry and the relative well positioning. To achieve this, synthetic real-time display of the reservoir physical characteristics is a valuable help. It is particularly important to have as many comparison points as possible between the theoretical model and the real-time data. Geosteering or reservoir navigation, is the process of utilizing any real-time data (in most cases, drilling and LWD data) to accurately position the wellbore relative to specific subsurface references and three-dimensional spatial coordinates. One objective of geosteering is to optimize placement of the wellbore relative to the reservoir while remaining within the constraints of the drilling and completion program.

The present invention provides for "Predictive Stratigraphy Images," which for example may be implemented in software. The invention provides for delivery of information about the lithology and the apparent stratigraphy as seen along a well path, and provides for direct comparison of the lithology along a well path to a cross-section geological view of the subsurface, and well as direct comparison with conventional wireline logging information and downhole image log information. The Predictive Stratigraphy Images are displayed on a track in an "open cylinder" style similar to a borehole "image log" type display.

Borehole image logs are a valuable source of information for describing structural framework, fracture patterns, sedimentary features, and in-situ stress orientation. In addition, high-resolution borehole images are used as an aid in conventional core description and orientation, as well as in the selection of intervals for formation testing, sampling, and perforating. For thinly laminated, turbidite sands and other sequences, they are often the only practical method of determining net sand and pay thicknesses in the absence of conventional cores.

Figure 4A:
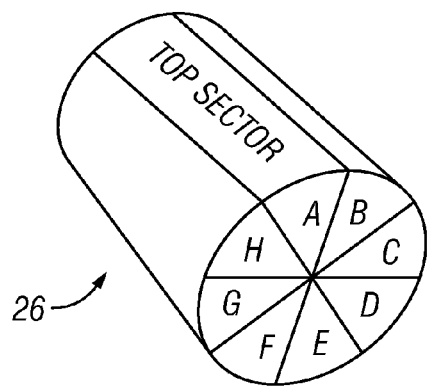
FIG. 4A is an illustration of sectors in a borehole

FIG. 4A illustrates how a well bore 26 may be divided into sectors circumferentially for acquiring measurements that will be input to creating image logs and/or input to the present invention. While eight sectors are used for illustration in this example, practitioners familiar with the art will know that the number of sectors for acquiring measurements in a borehole is arbitrary. Up to 64 measurement sectors or more are possible for data acquisition in a well bore. FIG. 4A arbitrarily contains eight sectors labeled A through H. For illustration in a well bore that is not truly vertical, sector A is arbitrarily chosen as the "top" relative to the center of the earth. Sector E is then chosen as the "bottom" of the eight sector example.

Figure 4B:
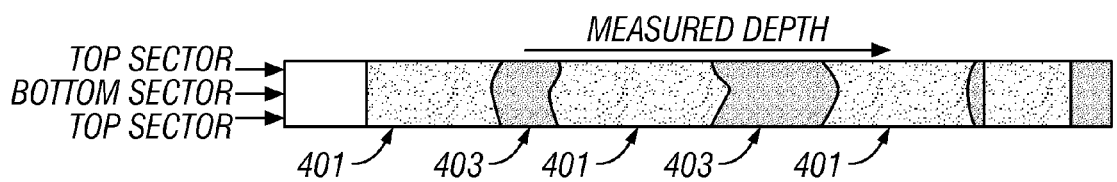
FIG. 4B illustrates a Predictive Stratigraphy Image according to provisions of the present invention.

An example of a Predictive Stratigraphy Image provided by the present invention is illustrated in FIG. 4B where the relationships of the sectors to the arbitrarily position well bore is shown. The top sector would correspond to sector A of FIG. 4A and the bottom sector would correspond to sector E. The Measured depth is the measured depth (the actual distance) along the well bore track or path. The Predictive Stratigraphy Image is created from a model using known information. The model is created from, for example, offset well information incorporated into a 3D earth model created from petrophysical and geophysical data, especially well data and seismic data.

Figure 4C:
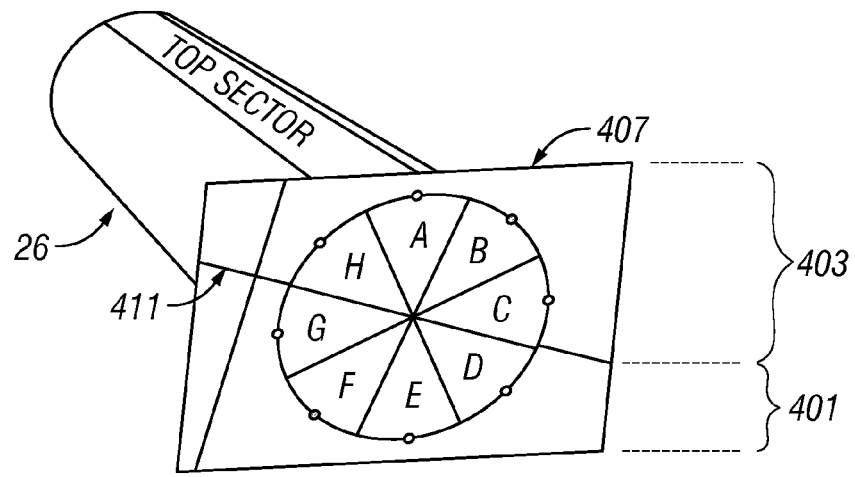
FIG. 4C illustrates the relationship of the borehole to the modeled stratigraphy.

FIG. 4C illustrates schematically the well path as the borehole 26 straddles a lithological boundary or horizon 411 of a vertical slice from a lithological 3-D model 407. The lithological boundary 411 separates a first lithology 401 from a second lithology 403. As data are acquired from the different sectors (A-H) around the borehole 26, with known dip and direction, the 3-D model from which vertical slice 407 is derived can be updated.

Figure 4D:
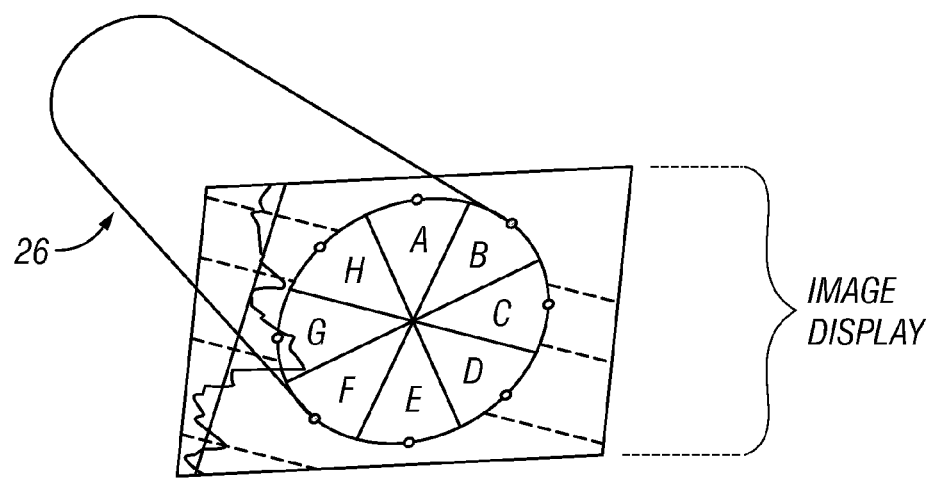
FIG. 4D illustrates the relationship of the borehole to a Predictive Image Log.

FIG. 4D illustrates an example of a 'Predictive Image Log' (PIL) where data from sectors around a well bore are arranged to provide an image of the borehole 26. Borehole images may be constructed using several techniques and tools, including but not limited to acoustic and resistivity tools.

The method and system of the present invention provide the capability to revise the resistivity forward-response models on location as real-time data updates provide knowledge of the reservoir. This allows for tuning the models as required during the drilling process to maintain or acquire an accurate location of critical bed boundaries, and for real-time updates to the Predictive Stratigraphic Image. Calculations of the distance of the wellbore to the nearest bed boundaries may be incorporated further aiding in evaluating the position of the wellbore relative to the drilling objectives. Ideally, real-time updates of MWD/LWD data are incorporated directly into the 3-D model and Predictive Stratigraphy Images. Survey, logging data and Predictive Stratigraphy Images are plotted against the model to illustrate the three dimensional position of the wellbore with respect to the spatial distribution of the reservoir, and with respect to reservoir features. Using the constantly updated 3-D geologic model and related displays also permit rapid updates to well plans at the rigsite should that be required.

An advantage provided by the method and system of the present invention is for real-time applications allowing the driller to improvise during the drilling process. That is, the driller is no longer confined to drilling a pre-determined course but can alter the well path as required to stay within the boundaries of the reservoir and maximize the productive interval drilled and completed for each well.

Figure 5A:
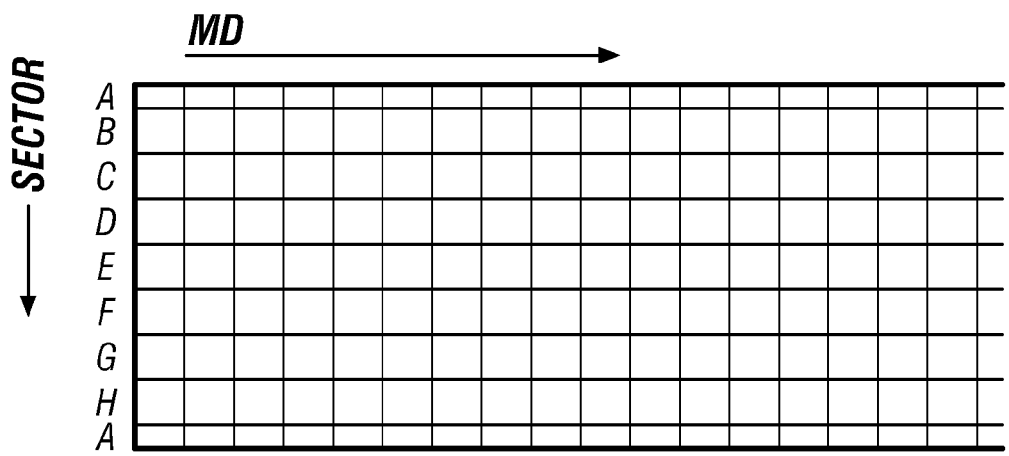
FIG. 5A illustrates the matrix of TSDs created using the model geometries.

The present invention provides for acquiring data and rendering the lithologies for the open cylinder image, the Predictive Stratigraphy Image, by obtaining a set of 2D elements to be 'painted' using a lithological symbol. These 2D elements are selected from areas of interest determined by delineating boundaries between features. These boundaries between features are determined from the differences in values from modeled data or acquired borehole data. One of the first steps is to create a matrix of borehole log or model values that are associated with True Stratigraphic Depths (TSDs) using model geometry. As a general matter, use of TSD in model and subsurface image creation is understood by practitioners in the art. However, the present invention provides a matrix associated with TSDs as illustrated in FIG. 5A for each sector (e.g. A-H) for each depth. The ordinate values are chosen in this display as the borehole sectors A through H, and ordinate cells 503 represent measured depth MD. The sector A is the top sector and sector E is the bottom sector.

Figure 5B:
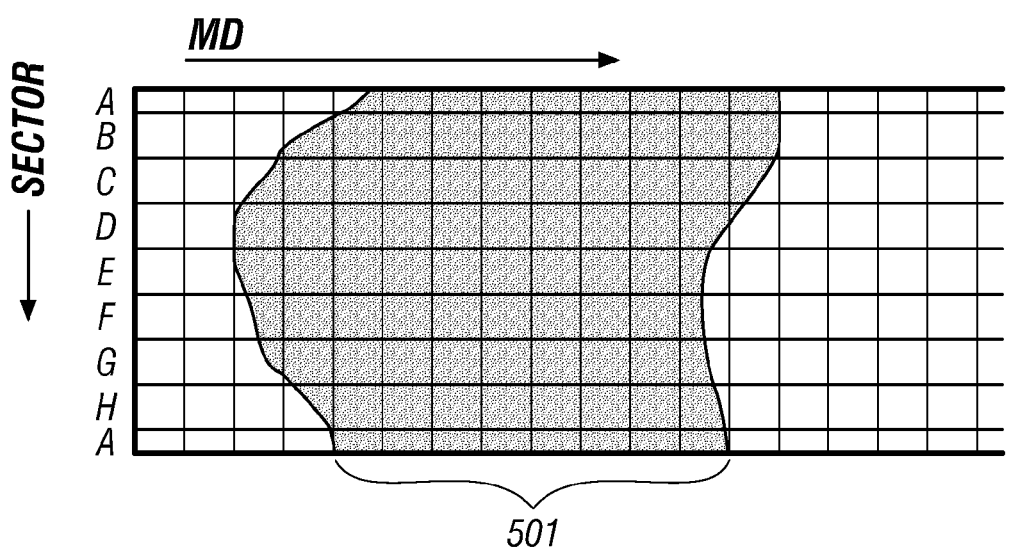
FIG. 5B illustrates a lithological unit contoured with a matrix.

FIG. 5B illustrates that each lithological unit 501 (inclusive of top and bottom depths) is contoured based on data from models or borehole log data. Lithological units may be known a priori, for example taken from offset wells. The resulting shapes can be classified into at least three types as illustrated in FIG. 6.

Figure 6:
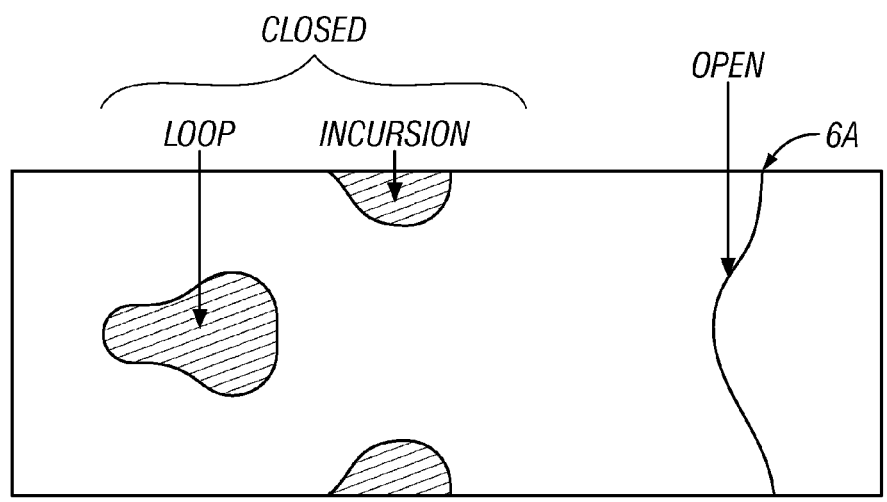
FIG. 6 illustrates closed and open geometries.

FIG. 6 illustrate the basic geometries found in the Predictive Stratigraphic Images. The 'closed' types of geometries are the loop and the incursion. The incursion feature occurs when the well bore traverses along a bed boundary in the top sector without completely entering the bedding layer above the layer the well path is located within prior to the incursion. The loop is similar in that it represents an area in which a bedding boundary is encountered in the bottom sector of the well bore path, again without completely entering the adjoining bedding or structural layer. A third geometry is the open segment 6A which is representative of a feature that is entirely crossed by the wellpath. This represents the situation where the well path has entered a different adjoining bedding/structural layer or a fault. A subsequent open segment encountered in the well path may represent where the feature, (bedding layer, structural feature, geological fault) has been exited.

Figure 7:
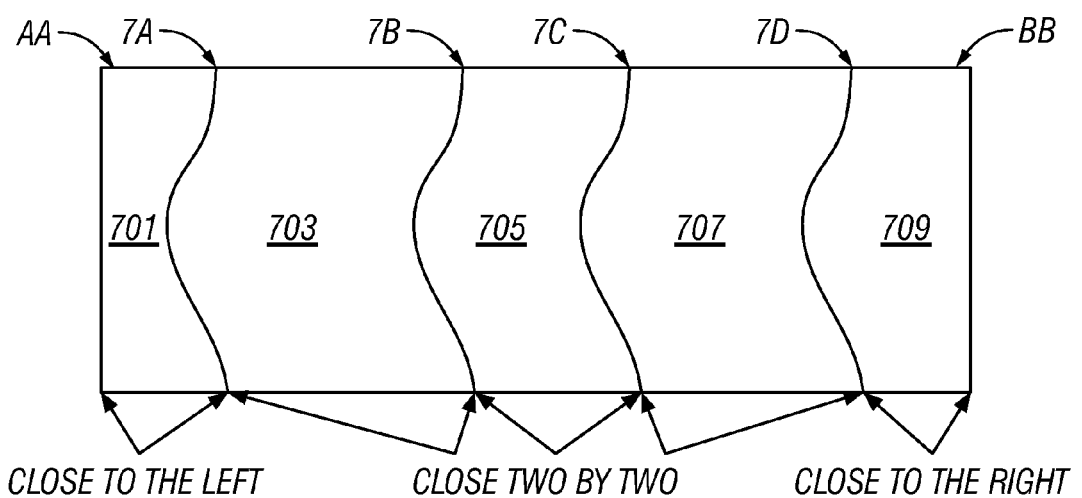
FIG. 7 illustrates areas delineated by open geometries.

FIG. 7 illustrates open geometries represented by boundaries 7A, 7B, 7C and 7D for a Predictive Stratigraphy Image. Along any Predictive Stratigraphy Image the segments along the well path may be closed. Between a terminus AA of the Predictive Stratigraphy Image and open segment 7A is an area that may be closed, this area 701 may represent a particular lithology. Other areas that close are area 703 between 7A and 7B, area 705 between 7B and 7C, area 707 between 7C and 7D, and finally area 709 between 7D and terminus BB. Each of these areas may represent a separate lithology, as the open geometry features represent bedding layer boundaries. Even though these areas may represent separate lithologies, they may also represent fault blocks separated by fault planes or other features.

Figure 8:
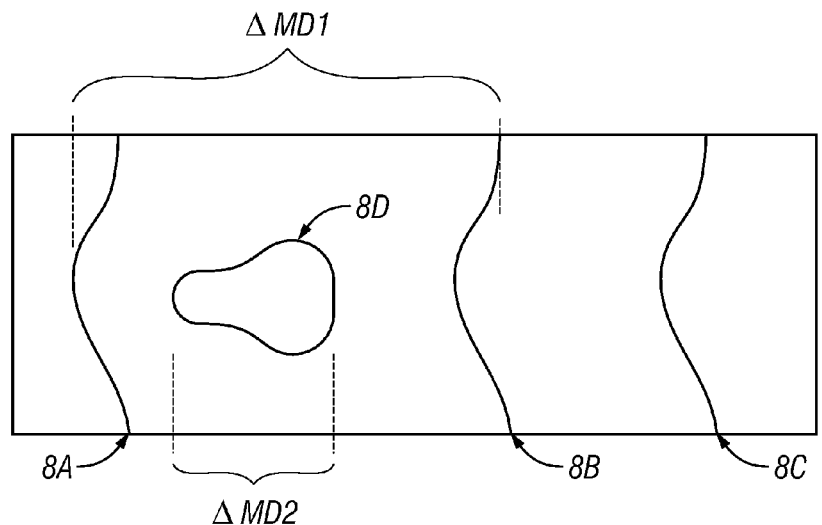
FIG. 8 illustrates how areas of loops and incursions may be delineated in relation to open geometries.

FIG. 8 illustrates the relationship of the loops and incursions illustrated in FIG. 6 and how they may be logically delineated as areas in a display view, so that the areas may be most efficiently rendered for 'painting.' Painting is filling in an area, for example graphically, for display or other purposes. The larger areas are rendered first. This requires sorting shapes by decreasing measured depth length ($\Delta$MD). For the usual case then, any areas defined between an 'open geometry' like 8A and 8B will chosen ('painted') first with a chosen attribute. The painting may be indicative of a lithology. Subsequently, loops or incursions will be painted. The logic then is as illustrated in FIG. 8 where $\Delta$MD1>$\Delta$MD2. Shape 1 (which substantially between 8A and 8B with length approximate to $\Delta$MD1) may be painted first, and then Shape 2 (surrounded by apparent boundary 8D with a shape length in the borehole direction approximate to $\Delta$MD2) may be painted with a second attribute.

When these areas have been determined, lithologies may be assigned to each area of the Predictive Stratigraphy Image. The present invention provides for sharp demarcations between lithological boundaries in contrast to well bore images. The Predictive Lithology Images offer more concise information, at the scale of the well bore's radius (for example, a few decimeters) rather than being at the scale of a subsurface model cross-section's vertical range (which may be tens or hundreds of meters).

Figure 9A:
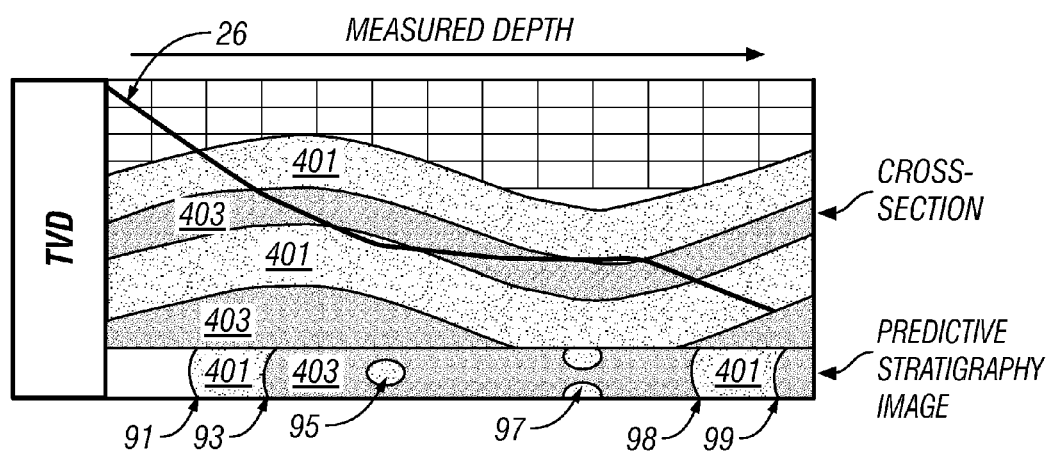
FIG. 9A illustrates the relationships of the PSI to the borehole and cross-sectional data.

FIG. 9A illustrates the Predictive Stratigraphy Image PSI and the PSI relationships with a borehole 26, a Stratigraphy Cross-section. For simplicity, as in previous lithology displays, only two different lithologies, 401 and 403, are illustrated, and will be appreciated that an arbitrary number of lithologies or structural features may be represented. The PSI is the circumferential representation of the lithology of the borehole 26 as the well path traverses the Stratigraphy Cross-section. The 'top' sector is represented as the top of the PLI, thereby forming an incursion geometry (reference FIG. 6). The Stratigraphy Cross-section may be created from data prior to drilling and then updated as information from drilling operations is available. Open geometries 91, 93, 98 and 99 are illustrated representing the well path crossing bedding layers. The geometry loop 95 and incursion 97 illustrate the borehole 26 as it partially enters the bedding layer 'below' and touches the bedding layer 'above' respectively.

Figure 9B:
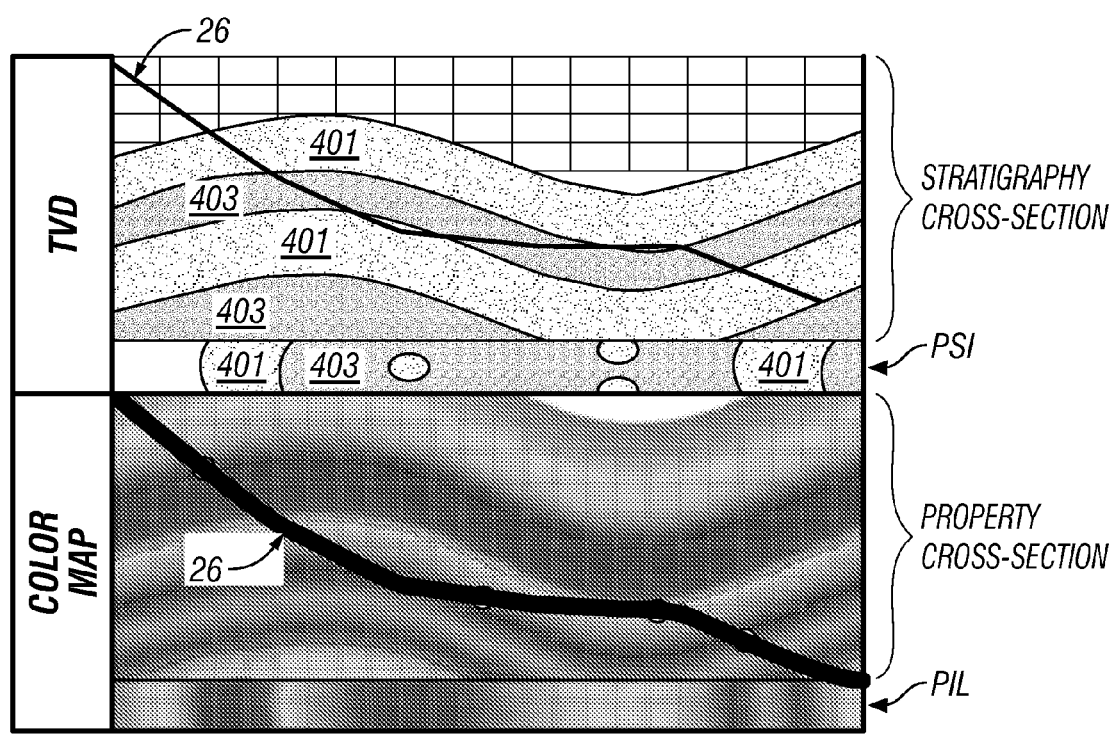
FIG. 9B illustrates the relationships of the PSI to the borehole and cross-sectional data and property displays.

FIG. 9B illustrates the Predictive Stratigraphy Image PSI of FIG. 9A and the PSI relationships with a borehole 26, a Stratigraphy Cross-section, a Property Cross-section and a Property Image Log PLI. The Predictive Stratigraphy Image PSI is a lithological representation around the circumference of the borehole 26 as it passes through the Stratigraphic Cross-section as illustrated in FIG. 9A.

The Predictive Stratigraphy Image supplements other geosteering related components: Cross-section in gradients based on a reservoir property; Lithological cross-section to which it brings precision (scale and information on the third dimension); Combined with a real-time "image-log" it helps in comparing and validating the model. The present invention provides for intentional directional control of a well based on the results of data acquired from downhole logging measurements and will enable operators to keep a directional wellbore within a pay zone. In mature areas, Predictive Stratigraphy Imaging aided geosteering may be used to keep a wellbore in a particular section of a reservoir to minimize gas or water breakthrough and maximize economic production from the well.

Figure 10:
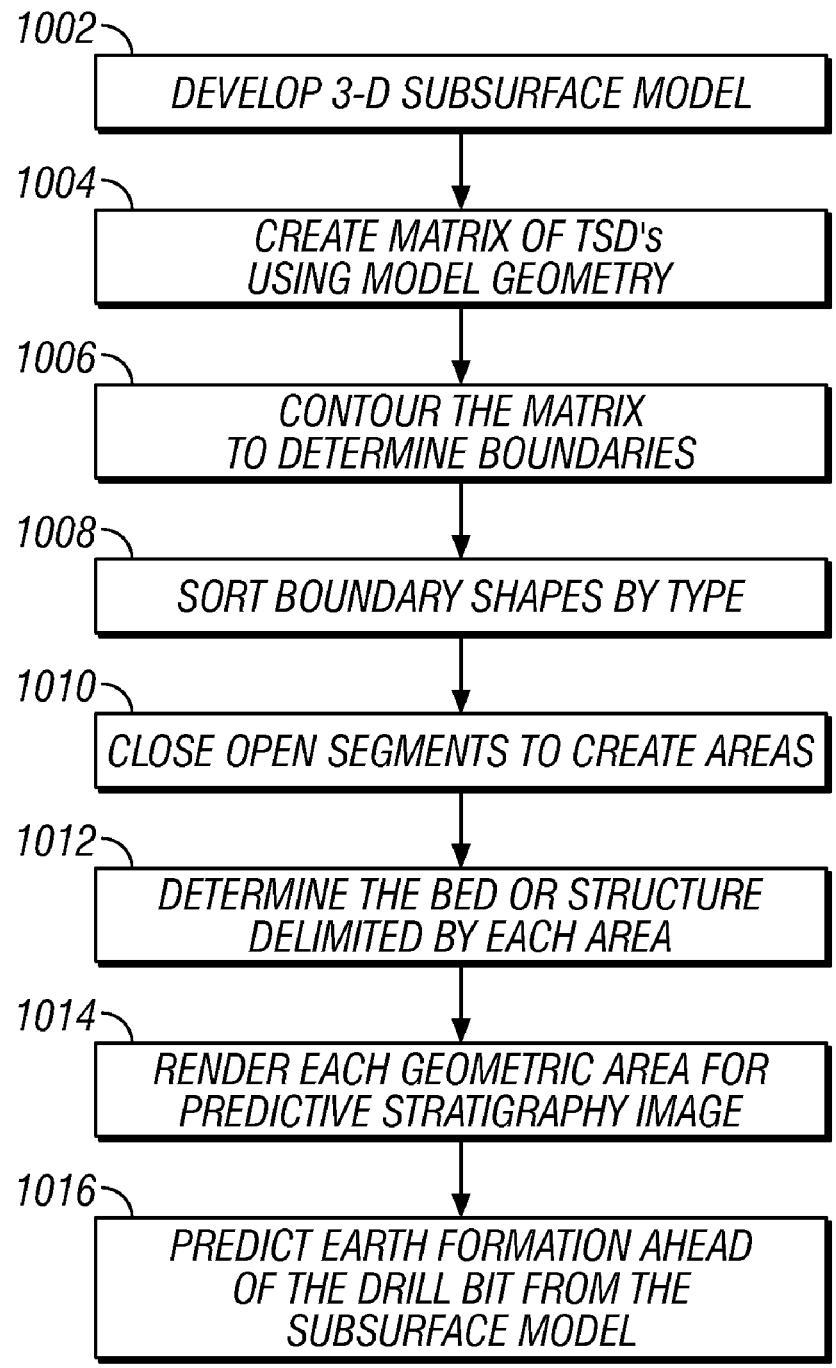
FIG. 10 is a flow chart that illustrates the method and system provided by the present invention.

FIG. 10 illustrates that a 3-D model may be developed of the subsurface 1002. A matrix of True Stratigraphic Depths is created for the model 1004. The matrices are contoured with areas of lithology for the 3-D model 1006. The shapes of the areas of lithology are sorted by type 1008, after the manner described in FIGS. 6 to 8. 'Open' segments are closed such that lithological areas are determined 1010. Then, the bed or structure the well path is traversing is delimited by area 1012. Finally, each segment area of lithology is rendered to create the Predictive Stratigraphy Image 1014. The Predictive Stratigraphy Image and the 3-D model may be updated with subsurface data from drilling operations. The updated 3-D model may be used to predict the earth formation environment ahead of the drill bit 1016 and facilitates geosteering the drilling apparatus towards and within desired subsurface targets.

The present invention provides methods and systems for determining properties of an earth formation ahead of drilling equipment in a borehole. A model of the earth formation is developed from borehole log data and any other sources of subsurface information. A matrix of sectored borehole log values is created that is associated with true stratigraphic depths as measured or acquired along a borehole. The matrix of values are contoured to determine at least one boundary. An area of interest delineated by the at least one boundary is determined. A property of the earth formation represented by the determined area of interest is determined. Features and properties of the earth formation ahead of the BHA position may be predicted from the developed and updated model of the earth formation. Updating the model may be accomplished from sectored data acquired with logging equipment in the borehole as an earth formation is being drilled. Lithology, stratigraphy and structural features may be determined from the combination of acquired logging values, borehole geometry and shapes of the boundaries separating areas of interest determined from the matrix values. Properties of the earth formation may be representative of types of lithology or stratigraphy and subsurface structural features like faults. Predictive Stratigraphy Images may be obtained by rendering areas of interest.

The foregoing description is directed to embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method of evaluating an earth formation, the method comprising:
   (a) developing a lithological model of the earth formation from borehole log measurement data comprising;
      (i) defining a two-dimensional matrix using a plurality of azimuthal sectors around circumference of the borehole and a plurality of measured depths along the borehole;
      (ii) creating a sectored borehole log value for each element of the matrix based on borehole log measurement data and associating the value with the element; and
      (iii) contouring the matrix of sectored borehole log values;
   (b) determining an area of interest delineated by at least one determined contour;
   (c) determining a lithological property of the earth formation represented by the determined area of interest;
   (d) rendering a predictive startigraphic image of the area of interest on a display screen using the lithological property around the circumference of the borehole; and
   (e) storing the determined area of interest and lithological property of the earth formation in computer memory.

2. The method of claim 1 further comprising determining the lithological property of the earth formation ahead of a bottom hole assembly (BHA) position from the lithological model of the earth formation.

3. The method of claim 1 further comprising:
   conveying a logging tool into a borehole in the earth formation and rotating the tool therein to acquire a plurality of measurements defining the borehole log measurement data.

4. The method of claim 1, wherein the area of interest is chosen using at least one of:
   i) lithology, ii) stratigraphy, and iii) a structural feature comprising at least one of a fault and a boundary.

5. The method of claim 1, wherein the determined property of the earth formation represents at least one of: i) a lithology type, ii) a stratigraphy type, iii) a structural feature type.

6. The method of claim 1 wherein the at least one boundary is selected from the group consisting of: i) a loop, ii) an incursion and iii) an open segment.

7. The method of claim 1, further comprising predicting the earth formation ahead of a drill bit from the lithological model of the earth formation.

8. A system for determining a lithological property of an earth formation using a logging tool on a bottomhole assembly (BHA) in a borehole in the earth formation, the system comprising:
   (a) a logging tool configured to be conveyed in a borehole in the earth formation, the logging tool configured to obtain borehole log measurement data at a plurality of measured depths along the borehole and a plurality of azimuthal orientations; and
   (b) a processor configured to:
   (A) develop a lithological model of the earth formation from the borehole log measurement data comprising;
      (i) defining a two-dimensional matrix using a plurality of azimuthal sectors around circumference of the borehole and a plurality of measured depths along the borehole;

(ii) creating a sectored borehole log value for each element of the matrix based on borehole log measurement data and associating the value with the element; and
(iii) contouring the matrix of sectored borehole log values;
(B) determine an area of interest delineted by the at least one determined contour;
(C) determine a lithological property of the earth formation represented by the determined area of interest;
(D) render a predictive startigraphic image of the area of interest on a display screen using the lithological property around the circumference of the borehole; and
(E) store the determined area of interest and lithological property of the earth formation in computer memory.

9. The system of claim 8, wherein the processor is further configured to update the lithological model of the earth formation to determine the lithological property of the earth formation ahead of the BHA.

10. The system of claim 8, wherein the processor is further configured to determine the area of interest using at least one of: i) lithology, ii) stratigraphy, and iii) a structural feature comprising at least one of a fault and a boundary.

11. The system of claim 8 wherein the processor is further configured to determine the property of the earth formation representing at least one of: i) a lithology type, ii) a stratigraphy type, iii) a structural feature type.

12. The system of claim 8 wherein the at least one determined boundary is selected from the group consisting of: i) a loop, ii) an incursion and iii) an open segment.

13. The system of claim 8, wherein the processor is further configured to predict the earth formation ahead of a drill bit from the lithological model of the earth formation.

* * * * *